US006622088B2

(12) United States Patent
Hood (10) Patent No.: US 6,622,088 B2
(45) Date of Patent: Sep. 16, 2003

(54) AMBULATORY NAVIGATION SYSTEM (75) Inventor: Michael Scott Hood, Batesville, IN (US)

(73) Assignee: Hill-Rom Services, Inc., Wilmington, DE (US)

( * ) Notice: Subject to any disclaimer, the term of this patent is extended or adjusted under 35 U.S.C. 154(b) by 0 days.

(21) Appl. No.: 09/798,398

(22) Filed: Mar. 2, 2001

(65) Prior Publication Data

US 2002/0123843 A1 Sep. 5, 2002

(51) Int. Cl.[7] .................................. G08G 1/09
(52) U.S. Cl. ....................................... 701/211
(58) Field of Search ................. 701/23–25, 200–202, 701/206–213; 342/352, 357.01, 357.06–357.09, 357.12–357.13, 385–386, 457; 340/425.5, 431–434, 473–475, 5.42, 5.5, 5.51–5.53, 5.6, 825.36, 286.06–286.09, 944, 988–991, 993–996

(56) References Cited

U.S. PATENT DOCUMENTS

| 4,709,330 A | 11/1987 | Yokoi et al. |
| 4,817,043 A | 3/1989 | Brown |
| 4,935,907 A | 6/1990 | Friedman |
| 4,974,170 A | 11/1990 | Bouve et al. |
| 4,991,126 A | 2/1991 | Reiter |
| 5,062,151 A | 10/1991 | Shipley |
| 5,289,572 A | 2/1994 | Yano et al. |
| 5,337,046 A | 8/1994 | Grasset |
| 5,438,321 A | 8/1995 | Bernard et al. |
| 5,470,233 A | 11/1995 | Fruchterman et al. |
| 5,559,707 A | 9/1996 | DeLorme et al. |
| 5,561,412 A | 10/1996 | Novak et al. |
| 5,629,981 A | 5/1997 | Nerlikar |
| 5,635,907 A | 6/1997 | Bernard et al. |
| 5,699,038 A | 12/1997 | Ulrich et al. |
| 5,838,223 A | 11/1998 | Gallant et al. |
| 5,842,145 A | 11/1998 | Zimmer |
| 5,864,125 A | * 1/1999 | Szabo .................. 235/384 |
| 5,902,347 A | 5/1999 | Backman et al. |
| 5,908,465 A | 6/1999 | Ito et al. |
| 6,119,065 A | 9/2000 | Shimada et al. |
| 6,169,515 B1 | * 1/2001 | Mannings et al. ....... 342/357.1 |
| 6,199,010 B1 | * 3/2001 | Richton ................ 340/7.29 |
| 6,360,167 B1 | * 3/2002 | Millington et al. .... 342/357.06 |
| 6,405,126 B1 | * 6/2002 | Palomo et al. ........... 340/990 |

FOREIGN PATENT DOCUMENTS

| DE | 20006566 | 9/2000 | |
| EP | 0 578 374 A1 | 1/1994 | |
| EP | 0726447 | * 8/1996 | ........... G01C/21/20 |
| JP | 11-344354 | * 12/1999 | ........... G01C/21/00 |
| WO | WO 82/02271 | 7/1982 | |

* cited by examiner

Primary Examiner—Thu Nguyen
(74) Attorney, Agent, or Firm—Bose McKinney & Evans LLP (57) ABSTRACT The present invention provides a navigation system configured to direct a person to a selected destination using information from an information carrying member.

71 Claims, 9 Drawing Sheets

AMBULATORY NAVIGATION SYSTEM

BACKGROUND AND SUMMARY OF THE INVENTION

The present invention relates to a navigation system and in particular to a navigation system for use guiding a pedestrian to a selected destination.

It is often difficult for people unfamiliar with a large facility such as a healthcare facility, airport, professional office building, college campus, sports stadium, or shopping center to find their way to a selected destination within the facility. The present invention provides a navigation system configured to direct a person to a selected destination using a card, a badge, or any other identification device or technique, such devices broadly indicated herein by the term "information carrying member".

The system illustratively includes an input device configured to receive information from the information carrying member, a processor coupled to the input device, and a communication member coupled to the processor. The processor is configured to determine instructions to direct the person toward the selected destination and to communicate the instructions to the person using the communication member. In some embodiments, the system may also include a database capable of storing and providing information about the person, information about the destination, and other pertinent information.

In an illustrated embodiment, the input device is an information detector configured to identify the selected destination automatically from the information carrying member. The communication member illustratively includes at least one of a display, a speaker, and a printer which provides the instructions to the person.

Also in one illustrated embodiment, the information carrying member includes a language indicator to indicate a desired language for the instructions from the communication member. The input device is configured to receive the language indicator from the information carrying member, and the instructions are then communicated to the person by the communication member in the language specified by the language indicator.

Also in an illustrated embodiment, the navigation system includes a database and the information carrying member includes an identification device. The identification device illustratively interfaces with the communication member which in turn interfaces with the database. The database indicates the selected destination as well as instructions for how to proceed to the destination from the location of the communication member. Once the communication member is activated and once the communication member interfaces with the identification device, the communication member automatically accesses the database and provides the person with instructions to the selected destination. The identification device may include portable items such as encoded cards having an interface device such as a magnetic strip, a bar coded card or ticket, an RFID coil, or the like, a badge that emits infrared or radio frequency identification signals, or the like, or may even include a stationary device such as a reader capable of distinguishing the fingerprints, retina, or other identifying characteristics of the person. In addition, the database may include information such as, for example: the name of the person so that the instructions may be personalized; any significant conditions or handicaps of the person so that if, for example, the person is color blind the instructions can be tailored to omit references to colors or if the person is mentally or otherwise debilitated and is at an unexpected location the system can alert someone to provide assistance, or any other information that may be useful.

In an illustrated embodiment, a navigation system configured to direct a person to a selected destination using an information carrying member includes an input device configured to receive information from the information carrying member, a processor coupled to the input device, and a communication member coupled to the processor. The processor is configured to determine instructions to direct the person toward the selected destination and to communicate the instructions to the person using the communication member.

In one illustrated embodiment, the information carrying member includes information corresponding to the selected destination and the input device is an information detector configured to identify the selected destination automatically from the information carrying member. In another illustrated embodiment, the information carrying member includes identification information related to the person. In this embodiment, the navigation system further includes a database configured to store a selected destination corresponding to the identification information, the input device is configured to detect the identification information from the information carrying member, and the processor is configured to determine the selected destination from the database based on the identification information. The processor may also determine the instructions to direct the person toward the selected destination from the database.

In yet another illustrated embodiment, a navigation system configured to direct a person to a selected destination includes a first station having a first input device to select a destination, a first processor coupled to the first input device, and an output device coupled to the first processor. The output device is configured to provide an information carrying member for the person. The navigation system may also include a second station including a second input device configured to receive information from the information carrying member, a second processor coupled to the second input device, and a communication member coupled to the second processor. The second processor is configured to determine instructions to direct the person from the second station toward the selected destination and to communicate the instructions to the person using the communication member.

A method is also provided to navigate a person to a selected destination. The method includes the steps of providing a person with an information carrying member corresponding to the selected destination, providing a plurality of navigation stations at spaced apart locations, identifying the selected destination a selected one of the plurality of navigation stations based on the information carrying member, and communicating instructions to the person to direct the person to one of another of the plurality navigation stations and the selected destination.

In another illustrated embodiment, a method is provided to navigate a person to a selected destination which includes the steps of providing a person with an information carrying member including identification information related to the person and storing a selected destination of the person corresponding to the identification information in a database. The illustrated method also includes the steps of providing a plurality of navigation stations at spaced apart locations, detecting the identification information from the information carrying member at a selected one of the plurality of navigation stations, determining the selected destination of the person corresponding to the detected identification information from the database, and communicating instructions to the person to direct the person to one of another of the plurality navigation stations and the selected destination.

In further illustrated embodiment, a navigation system configured to direct a person to a selected destination includes a badge configured to transmit a signal including identification information related to the person, a database configured to store a selected destination for the person corresponding to the identification information, a receiver configured to receive the signal from the badge and detect the identification information, a processor coupled to the receiver, and a communication member coupled to the processor. The processor is configured to determine the selected destination for the person from the database based on the identification information received from the badge, to determine instructions to direct the person toward the selected destination, and to communicate the instructions to the person using the communication member. In the illustrated embodiment, a locating and tracking system is also provided to receive the signal from the badge and monitor a location of the person within a facility.

Additional features of the invention will become apparent to those skilled in the art upon consideration of the following detailed description of illustrated embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
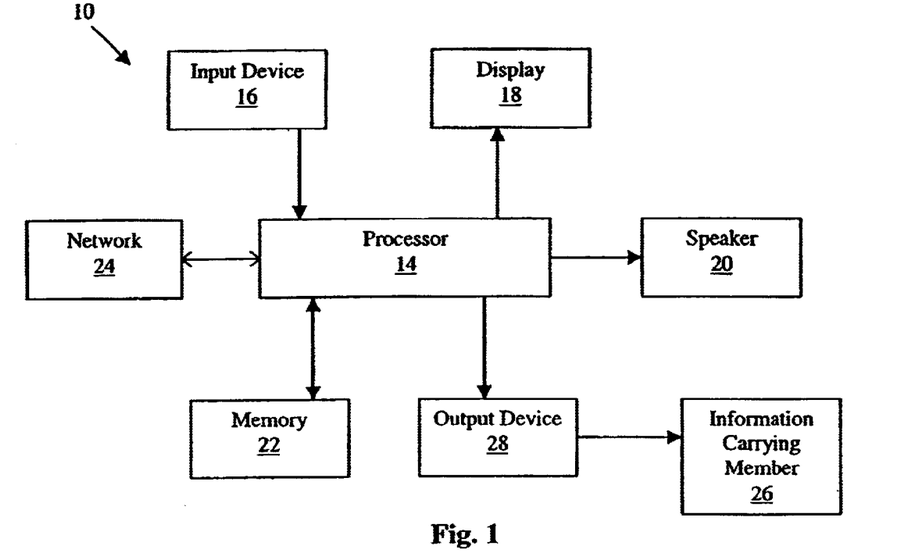
FIG. 1 is a block diagram illustrating components of a core station of the navigation system of the present invention.
Figure 2:
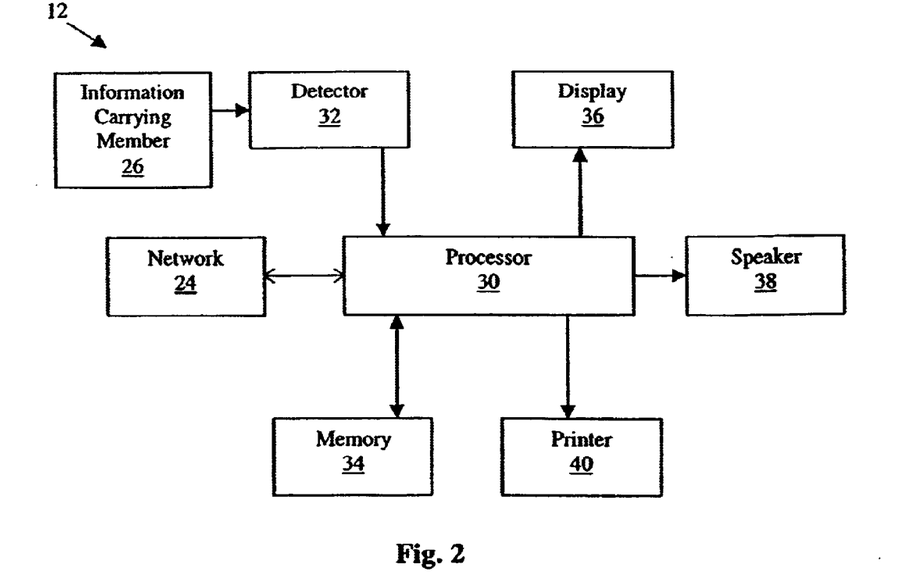
FIG. 2 is a block diagram illustrating components of a navigation station of the navigation system of the present invention.

Referring now to the drawings, FIGS. 1 and 2 illustrate components of an ambulatory navigation system of the present invention configured to provide directions to a selected destination to a pedestrian. FIG. 1 illustrates a first station or core station 10, and FIG. 2 illustrates a second station or a navigation station 12 of the present invention. As shown in FIG. 1, each core station 10 includes a processor 14 and an input device 16 coupled to the processor 14. The input device 16 is illustratively any type of input device such as a key board, key pad, mouse, touch screen, voice recognition, or other data recognition device. An operator uses the input device 16 to select a desired destination for the operator or another person.

Core station 10 further includes a display 18 and a speaker 20 coupled to the processor. In one embodiment, processor 14 displays a menu of destination options on display 18 for the user to select using the input device 16. Processor 14 is coupled to a memory 22 which stores information related to a plurality of destinations.

In addition, processor 14 of core station 10 may be coupled to a communication network 24, if desired. Network 24 is used to permit core station 10 to access other databases for information related to destinations which may be selected. Network 24 can also be used to update memory 22 with possible destinations to select.

The core station 10 is configured to generate an information carrying member 26 which has information related to or identifying the selected destination of the user. In the illustrated embodiment, the core station 10 includes an output device 28 configured to provide the information carrying member 26 with the specific information identifying the selected destination. In one embodiment, the output device 28 is a magnetic stripe encoder. In another embodiment of the present invention, the output device 28 is a bar code encoder. Yet another embodiment, the output device 28 is a smart card encoder. It is understood that the output device may be any type of device for placing information on or in the information carrying member 26.

In another embodiment of the present invention, an attendant specifically stationed at a location, such as a main entrance of a facility, communicates to the person and asks the desired destination. The attendant then either produces the information carrying member 26 based on the selected destination or retrieves a pre-made information carrying member 26 which includes information related to the selected destination.

Once the person has the information carrying member 26 having information related to the selected destination, information carrying member 26 is used at one of a plurality of navigation stations 12 to obtain directions either to another navigation station 12 or to the selected destination. As shown in FIG. 2, each navigation station 12 includes a processor 30 and a detector or input device 32 coupled to the processor 30. The detector 32 configured to identify the information on or in the information carrying member 26. The processor 30 uses the detected information to identify the selected destination either directly, or using information stored in memory 34 coupled to processor 30 or information obtained over a communication network 24 from a remote location.

Once the processor 30 determines the selected destination for the person based on the identified information, processor 30 determines directions to the selected destination from the location of the particular navigation station 12 or directions to another navigation station 12 closer to the selected destination. The navigation station 12 then provides the person with directions to the selected destination or another navigation station 12 using either display 36, speaker 38, or printer 40 coupled to processor 30. The processor 30 also identifies the selected destination on the display 36, speaker 38 or printer 40 so that the person can make sure that the directions are to the selected destination.

Therefore, in one embodiment the navigation system of the present invention does not rely upon the person to manually re-enter the selected destination at each navigation station 12. Once the information carrying member 26 is obtained, the navigation stations 12 automatically identify the information related to the selected destination and then provide the person with directions as discussed above. In the illustrated embodiments, the input device or detector 32 is a magnetic stripe reader, a bar code reader, a smart card reader, a receiver, or other detector which automatically detects information on the information carrying member 26.

Figure 3:
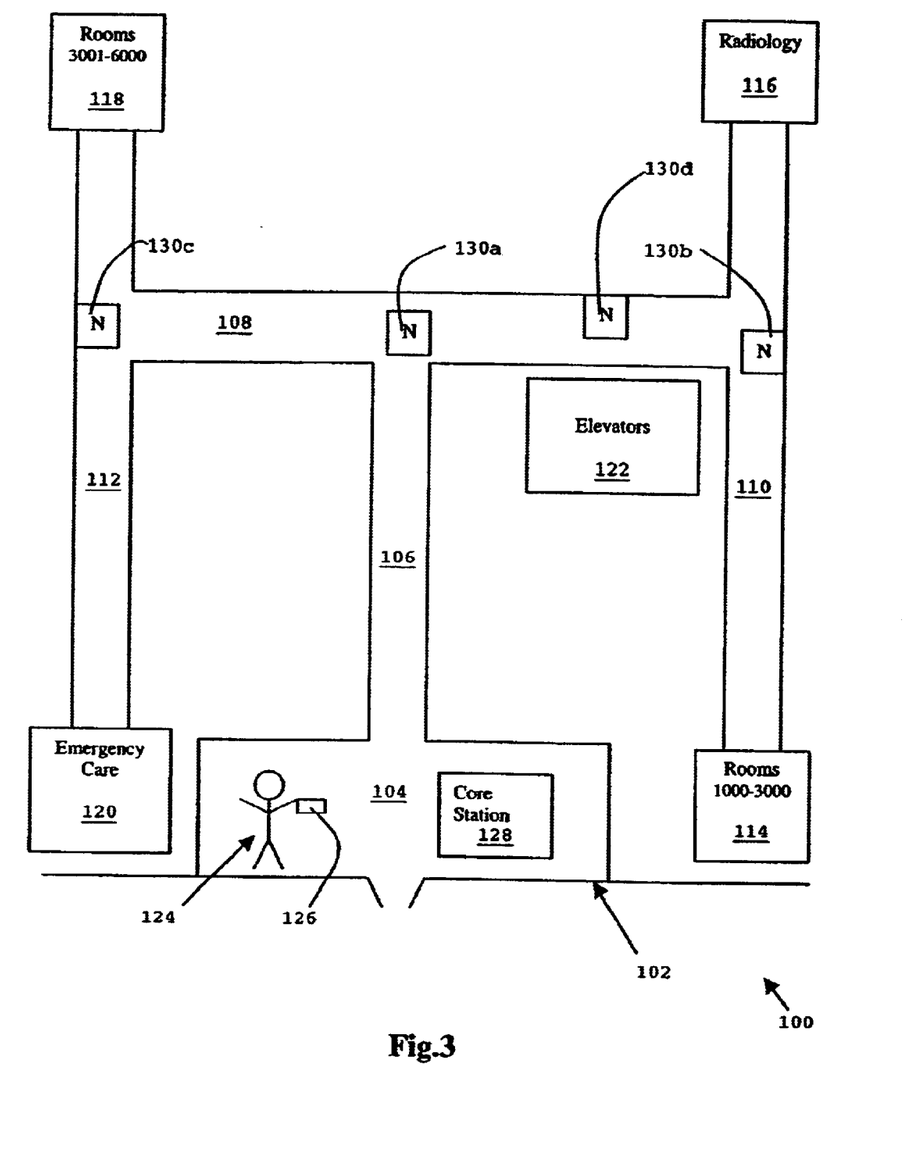
FIG. 3 is a diagrammatical representation of a portion of a healthcare facility illustrating an ambulatory navigation system of the present invention.

Referring now FIG. 3, a more detailed example of an embodiment of the ambulatory navigation system is disclosed. The ambulatory navigation system 100 guides a person through a facility by providing updated destination instructions at prominent locations within the facility. Ambulatory navigation system 100 is illustratively incorporated into a facility 102 such as a healthcare facility, airport, professional office building, college campus, shopping center, or the like. The system 100 can also be used outdoors with core stations and navigation stations located at selected places within the city.

Illustratively, healthcare facility 102 includes a main entrance area 104 connected to a hallway 106. Hallway 106 intersects a second hallway 108. Hallway 108 includes an access area to a bank of elevators 122 and intersects additional hallways 110, 112. The healthcare facility shown in FIG. 1 further includes a first ward of rooms 114 which are numbered between 1000 to 3000, a radiology department 116, a second ward of rooms 118 which are numbered between 3001 to 6000, and an Emergency Care Unit 120.

Ambulatory navigation system 100 illustratively includes an information carrying member 26 such as a set of key cards 126, at least one core station 128, and a plurality of navigation stations 130. Generally, a visitor 124 enters main entrance area 104 of healthcare facility 102 with the purpose of proceeding to a specific destination, such as a patient room to visit a family member. Visitor 124 is issued a key card 126 or other information carrying member 26 discussed above at main entrance 104. The key card 126 includes an information carrying member 133 containing information about the specific destination in the facility 102 of visitor 124. As visitor 124 proceeds through healthcare facility 102, key card 126 interacts with navigation stations 130a–130d to provide visitor 124 with appropriate destination instructions to the specific destination of visitor 124.

Figure 4A:
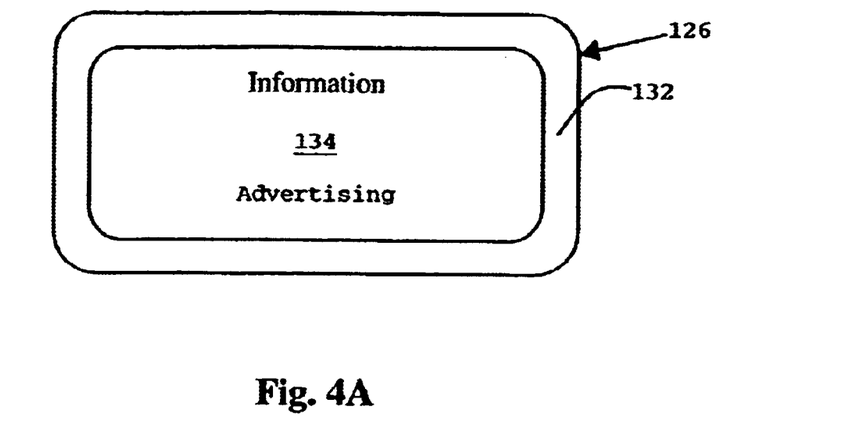
FIG. 4A is a front view of a visitor key card of the present invention.

One embodiment of key card 126 is shown in FIG. 4A. Key card 126 illustratively includes a body member 132 which is made from an inexpensive material, such as plastic. Key card 126 is similar to room access key cards currently used by hotels. Body member 132 includes a designated area 134 which is a location to provide information, such as emergency phone numbers, or advertising. The ability to place advertisements on key card 126 reduces the costs to the facility associated with the implementation and maintenance of ambulatory navigation system 100. Any conventional methods can be used to place information or advertising within area 134 of key card 126, such as conventional printing or the application of labels or stickers. In one embodiment, advertising and information is embossed within area 134 on key card 126.

Figure 4B:
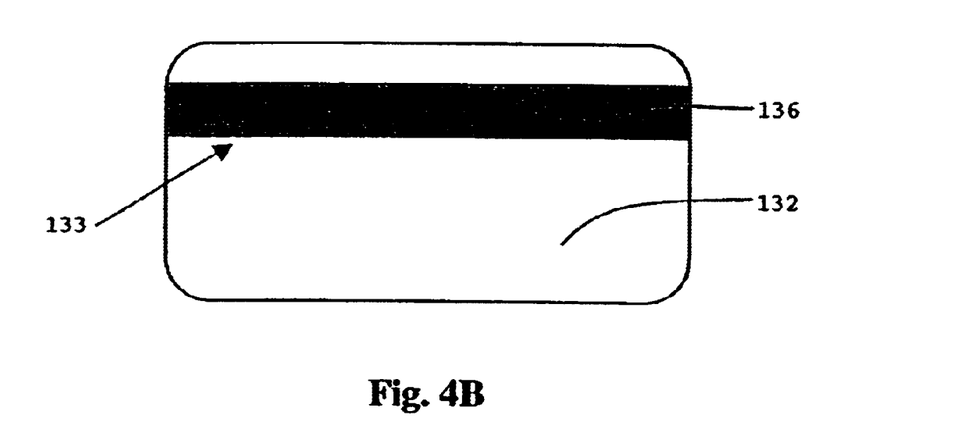
FIG. 4B is a rear view of the visitor key card of FIG. 2A.

FIG. 4B shows one embodiment of the rear side of key card 126. In FIG. 4B, the information carrying member 133 of key card 126 is a magnetic strip 136 which stores information. Magnetic stripe 136 is illustratively programmed by core station 128 to include a destination code corresponding to the final destination of visitor 124 as discussed above in reference to FIG. 1. Additionally, magnetic stripe 136 is read by an associated magnetic strip reader located on navigation stations 130 to communicate to navigation station 130 the destination code stored on magnetic strip 136 as discussed above in reference to FIG. 2.

Figure 4C:
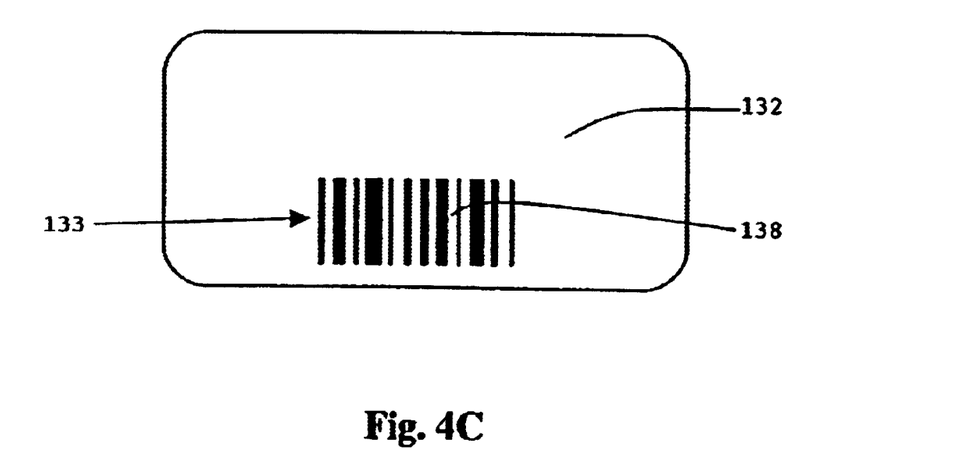
FIG. 4C is a rear view of a second embodiment of a visitor key card of the present invention.

FIG. 4C shows a second embodiment of the rear side of key card 126. In FIG. 4C, the information carrying member 133 of key card 126 is a bar code region 138 which contains a series of spaced dark bars. The destination code is illustratively determined by the width and spacing between the individual dark bars. Bar code region 138 is read by a bar code reader, such as an optical scanner, located on each navigation station 130 to communicate to navigation station 130 the destination code referenced by bar code region 138. In one embodiment, bar code region 138 contains the destination code, itself. In another embodiment, bar code region 138 is associated with a destination code stored on the system 100. As such, by reading bar code region 138, navigation station 130 is provided a pointer to query system 100 for the associated destination code.

It is contemplated that the information carrying member 133 of key card 126 is any system that which is capable of communicating information to navigation station 130. Examples include, re-radiating devices which emit a signal when queried by an interrogation signal or punched cards. Information carrying member 133 is also contemplated to be an active system, such as a battery powered transmitter, which emits a coded signal that is detected by navigation station 130. In another embodiment, the information is a location number which is manually entered by the visitor into navigation station 130.

In another embodiment, a double-sided key card 126 includes information carrying members 133 on both the front and rear sides of key card 126. The information carrying member 133 on the rear of key card 126 illustratively includes a destination code associated with the specific destination of visitor 124. The information carrying member 133 on the front of key card 126 includes a destination code associated with main entrance 104 of healthcare facility 102. As such, the front of key card 126 is used to navigate the visitor 124 from his specific destination back to main entrance 104.

Alternatively, visitor 124 is issued two individual key cards 126 at main entrance 104, each key card 126 containing one information carrying member 133. The first key card 126 is used to guide visitor 124 from main entrance 104 to his specific destination, and the second key card 126 is used to guide visitor 124 from his specific destination back to main entrance 104.

In another embodiment, when the facility has only a single appropriate or desired point of entrance, such as main entrance 104, visitor 124 is issued a single key card 126. In such a case, navigation stations 130 include the capability of providing appropriate destination instructions to main entrance 104 by the activation of a return function, such as by depressing a button located on navigation station 130 for directions back to the main entrance. When the return function is activated, the navigation station 130 automatically provides the appropriate destination instructions to proceed to main entrance 104.

Figure 5:
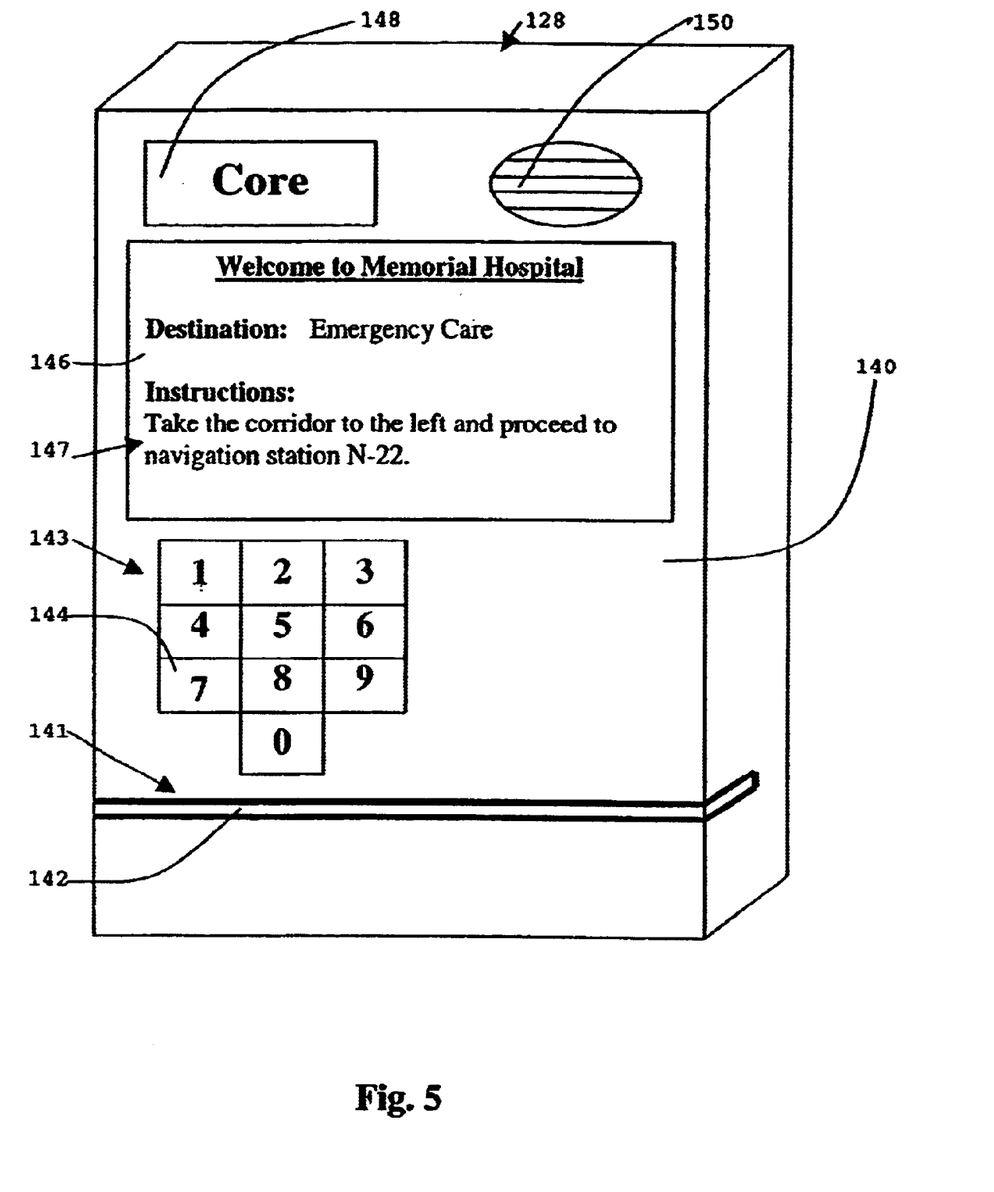
FIG. 5 is a front perspective view of a core station of the ambulatory navigation system of the present invention.

Referring to FIG. 5, an illustrated embodiment of core station 128 is shown. A core station 128 may be placed at all primary entrances and busy junctions, such as gift shops, cafeterias, and the like within the facility. Core station 128 is a programming unit which programs key card 126 or other information carrying member 26 as discussed above. The core station 128 is operated either by facility personnel or by visitor 124.

Core station 128 includes a directory member 143, either computer-based or push button selection member 144, which allows for the selection of a destination within the facility. The directory is connected to a database which provides a listing of the various destinations within the facility. The database is either locally stored in a memory of core station 128 or is retained on the facility network and accessed by core station 128. As shown in FIG. 5, core station 128 includes a housing 140 which contains an information output device 141. Additionally, core station 128 includes a display 146, a name plate 148 and a speaker 150.

In FIG. 5 information output device 141 is illustratively a key card slot 142 which interacts with the magnetic stripe 136 on key card 126. If the information carrying member 133 of key card 126 is not magnetic strip 136 then key card slot 142 is replaced with the appropriate output device such as discussed above with reference to FIG. 1. For instance if key card 126 includes bar code region 138 then output device is a bar code encoder and printer.

When visitor 124 approaches core station 128, the specific destination of visitor 124 is selected by using push button member 144. Once the destination is selected, key card 126 is passed through key card slot 142. During the passage of key card 126 through slot 142, core station 128 encodes the magnetic stripe 136 on key card 126 with a code that relates to the specific destination of visitor 124. Methods for encoding the key card 126 are well known in the art. In one embodiment, the destination selected and programmed is displayed on display 146 as a method of verifying that an error was not made. Also, the first set of appropriate destination instructions are shown on display 146 to provide visitor 124 with initial directions to his specific destination.

In one embodiment, information carrying member 133 is programmed to include a language indicator along with the specific destination code. The language indicator indicates to navigation station 130, in what language the appropriate destination instructions are to be provided to the person. As such, ambulatory navigation system 100 provides the flexibility needed for facilities 102 located in regions with diverse populations.

Figure 6:
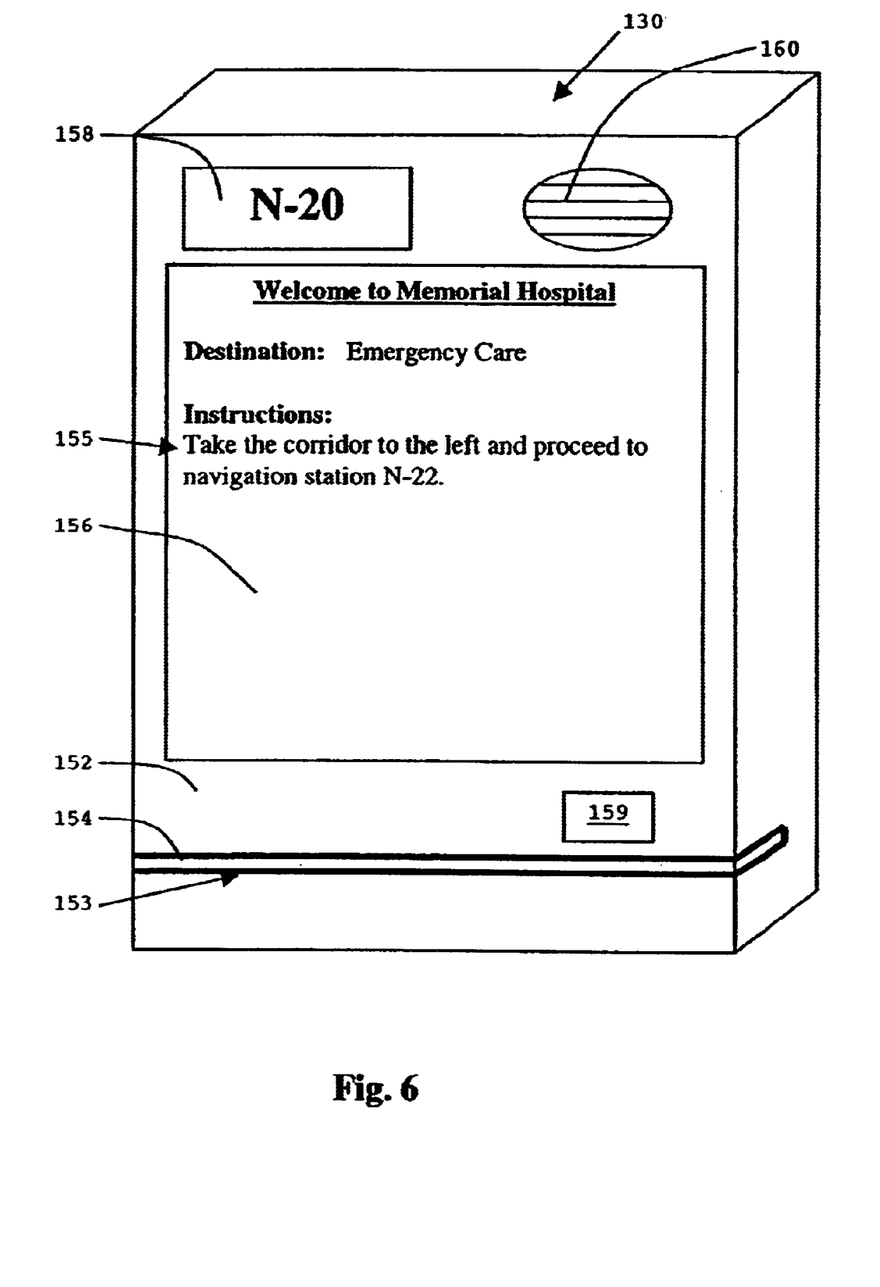
FIG. 6 is a front perspective view of a navigation station.

Referring to FIG. 6, an illustrated embodiment of a navigation station 130 is shown. Navigation station 130 is placed at intersection points or other location within the facility. An intersection point is a location within facility 102 where the visitor 124 is required to make a choice on which direction to proceed. For example, referring to FIG. 3, navigation station 130*a* is placed at the intersection of hallway 106 and hallway 108; navigation station 130*b* is placed at the intersection of hallway 108 and hallway 110; navigation station 130*c* is placed at the intersection of hallway 108 and hallway 112; and navigation station 130*d* is placed at the bank of elevators 122.

Navigation station 130 of FIG. 6 includes a housing 152, a information reading member 153, a display 156, a name plate 158 and a speaker 160. Information reading member 153 is illustratively a key card slot 154 which interacts with magnetic stripe 136 on key card 126. If the information carrying member 133 of key card 126 is not magnetic stripe 136 then key card slot 154 is replaced with the appropriate information reading member 153, input device or detector 32 as discussed above in reference to FIG. 2. For instance if key card 126 includes bar code region 138 then information reading member 153 is a bar code reader such as an optical scanner.

Navigation station 130, as shown in FIG. 6, operates in the following way. Visitor 124 upon approaching a navigation station 130 passes key card 126 through key card slot 154. Navigation station 130 reads the specific destination code stored on magnetic strip 136 of key card 126. Based upon the specific destination code, navigation station 130 provides visitor 124 with appropriate destination instructions. The appropriate destination instructions are provided either visually on display 156 or audibly through annunciator 160 or a combination of both. The instructions may also be printed.

Figure 7:
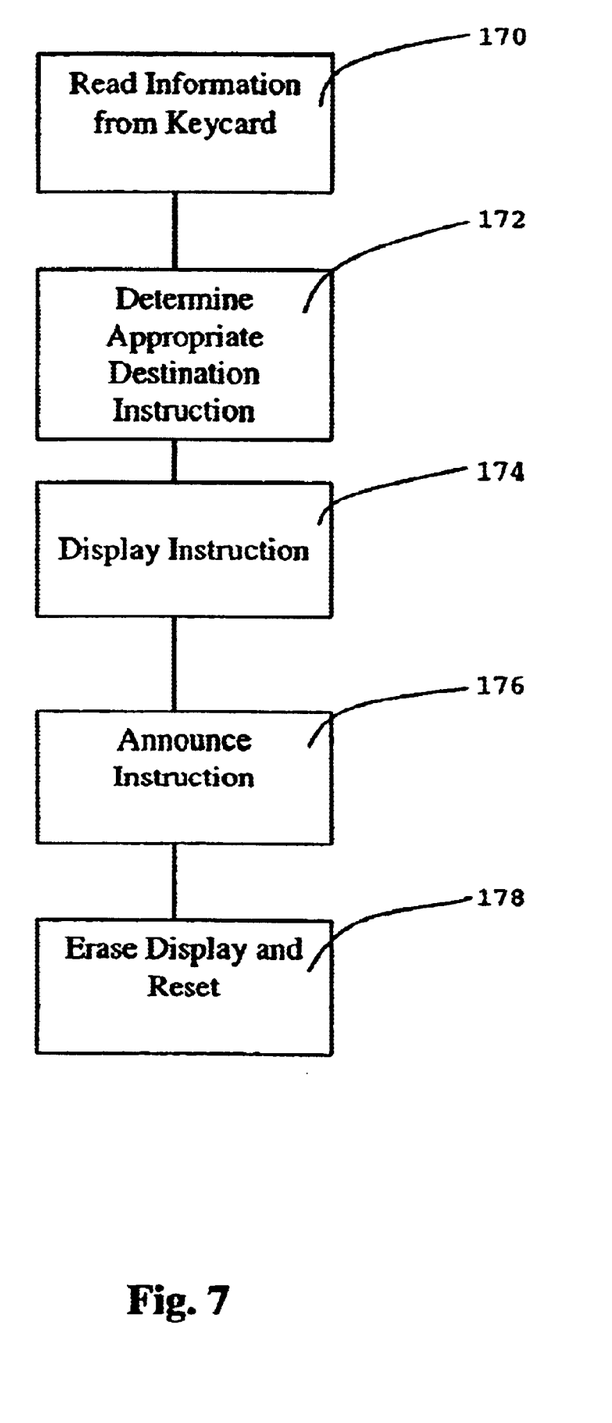
FIG. 7 is a flow chart illustrating steps performed by a navigation station during a direction sequence.

The steps performed by navigation station 130 are shown in FIG. 7. Navigation station 130 acquires the information contained on information carrying member 133 of key card 126, as represented by block 170. Station 130 then determines the appropriate destination instruction 155 to give to visitor 124, as represented by block 172. Navigation station 130 then displays the appropriate destination instruction 155 as represented by block 174. Additionally, navigation station 130, in one embodiment, audibly emits the appropriate destination instruction 155, as represented by block 176. After a pre-set time, navigation station 130 erases display 156, resets and waits for the next key card 126 to be passed through slot 154. Illustratively, the level of detail included in appropriate destination instruction 155 by navigation station 130 varies depending on the proximity of visitor 124 to his specific destination. For example, more detailed instructions are given the closer visitor 124 is to his specific destination. An example detailed instruction is, "Room 2571 is down the hallway to the left and is the fifth door on the right-hand side of the hallway." A more general instruction is given by navigation station 130 when visitor 124 is further from his specific destination, such as, "Take the hallway to the right, go the elevators on the left hand side and proceed to third floor."

In one embodiment, navigation station 130 provides visitor 124 with all the instructions required to navigate from navigation station 130 to the specific destination of visitor 124. As such, visitor 124 needs only to stop at a future navigation station 130 if he forgets the last set of appropriate destination instructions.

Typically, if appropriate destination instruction 155 does not take visitor 124 to his specific destination, the instruction does take visitor 124 to the next navigation station 130. Referring to FIG. 3, in an illustrated embodiment, visitor 124 leaves core station 128 and approaches navigation station 130*a* at the intersection of hallway 106 and hallway 108. If the visitor destination is emergency care unit 120, navigation station 130*a* provides visitor 124 with the following appropriate destination instruction 155, "Turn to the left and proceed to the navigation station located at the T in the hallway." Alternatively, the appropriate destination instruction 155 could include the name of the next navigation station in the instruction. For example, the appropriate destination instruction 155 might be, "Turn to the left and proceed to the navigation station 130*c*".

Figure 8:
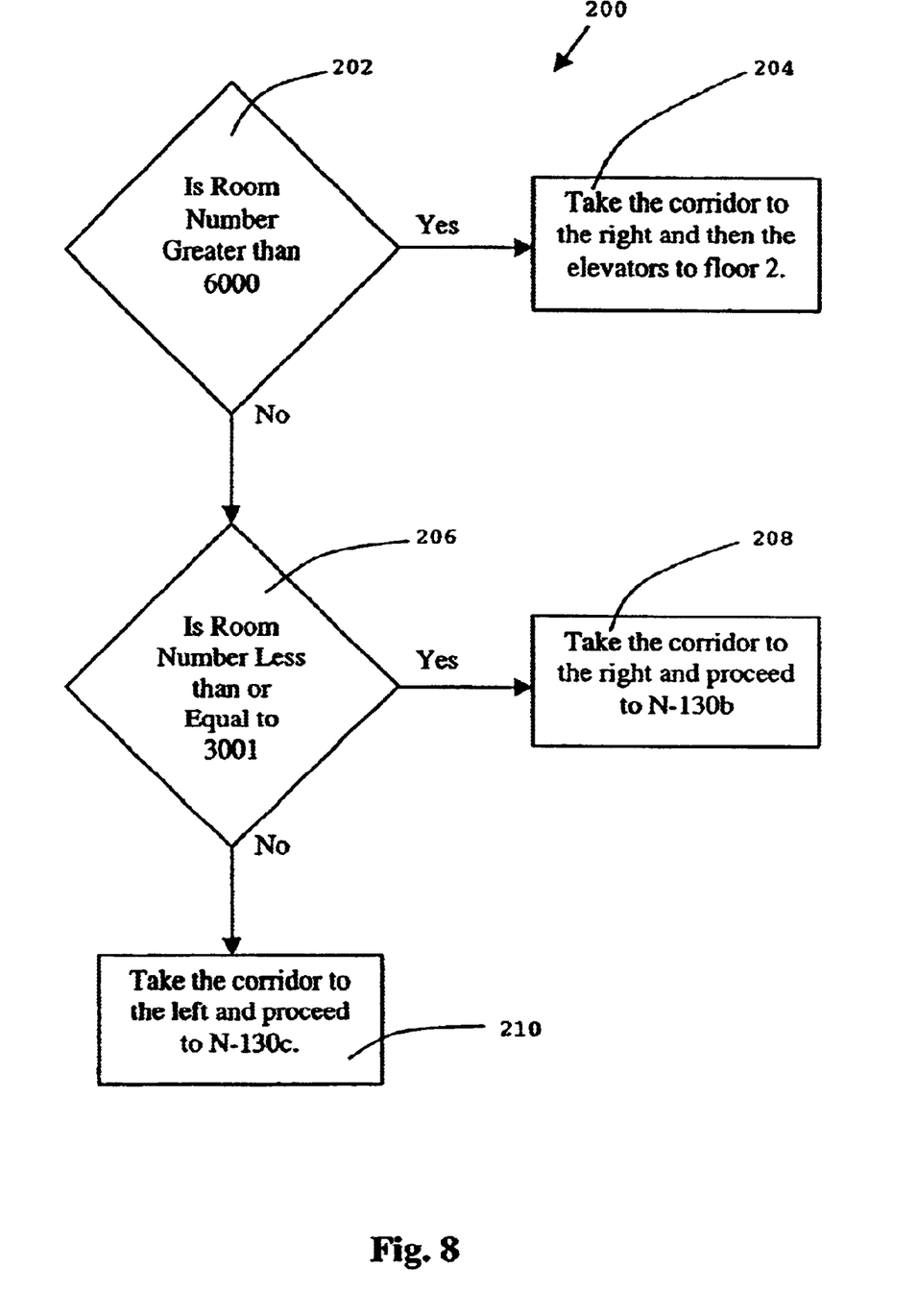
FIG. 8 is a flow chart illustrating the destination instruction logic executed by a navigation station.

Referring to FIG. 8, an embodiment of the appropriate destination instruction logic 200 used by the processor 30 within navigation station 130 is shown. Referring to FIGS. 3 and 8, visitor 124 proceeds down hallway 106 with key card 126 to navigation station 130*a*. Upon approaching navigation station 130a, visitor 124 passes key card 126 through key card slot 154a. Appropriate destination instruction logic 200, based on the location of navigation station 130, provides a manageable method of determining the appropriate destination instruction 155 to display. The logic 200 provided in FIG. 8 is tailored to the location of navigation station 130a within facility 102 in FIG. 3 and with the assumption that the destination code stored in information carrying member 133 corresponds to a patient room number. As such, FIG. 8, is only an example of logic 200.

The first step of logic 200, as represented by block 202, is to determine whether the room number programmed on key card 126 is greater than 6000. If the room number is greater than 6000 the appropriate destination instruction 155 displayed by navigation station 130a is, "Take the corridor to the right to the bank of elevators on the right and proceed to the second floor." If the room number is not greater than 6000, logic 200 determines if the room number is less than or equal to 3001, as represented by block 206. If the room number is less than 3001, then the appropriate destination instruction 155, as represented by block 208, displayed by navigation station 130a is, "Take the corridor to the right and proceed to navigation station 130b." If the room number is greater than or equal to 3001, then the appropriate destination instruction 155 displayed by navigation station 130A, as represented by block 210, is, "Take the corridor to the left and proceed to navigation station 130c". Assuming visitor 124 is proceeding to patient room 4002, the logic 200 would display the instructions provided in block 210 because room number 4002 is less than 6000 and greater than 3001.

Additional features are included in other embodiments of ambulatory navigation system 100. For example, as discussed before, if the facility 102 has a single point of entrance, such as main entrance 104, navigation station 130 may include a button 159 or other member for activating navigation station 130 such that navigation station 130 provides appropriate destination instructions 155 on how to return to main entrance 104. Additionally, in one embodiment, navigation station 130 and core station 128 provide a call system and each includes a speaker 160, a microphone, and a call button. As such, navigation stations 130 and core station 128 would operate as a call system to allow visitors 124 to call core station 128 to ask facility personnel for additional instructions. Additionally, in one embodiment, navigation station 130 and core station 128 are integrated into a caregiver locating and tracking system, such that the last known location of visitor 124 is ascertainable in case of emergency or such that traffic patterns of visitors are determined for analysis.

Figure 9:
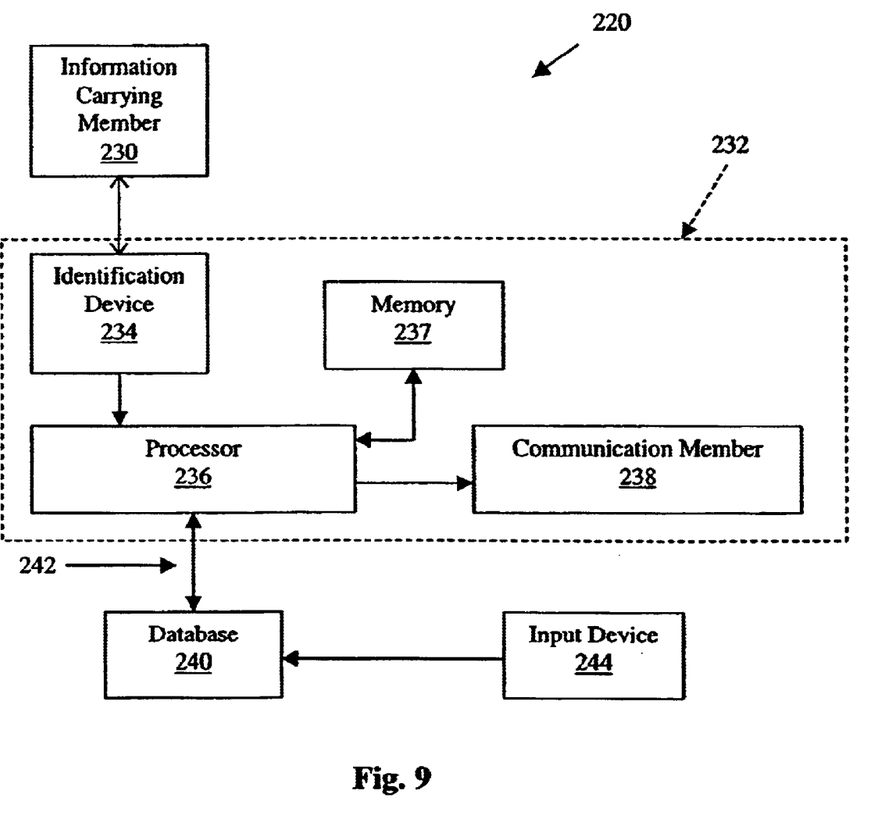
FIG. 9 is a block diagram illustrating another embodiment of the present invention which uses an identification number and a database which interfaces with a communication member to provide navigation instructions to a selected destination.

Another embodiment of the present invention is illustrated in FIG. 9. In the FIG. 9 embodiment, the information carrying member 230 provides identification information such as an identification number or other unique identification signal, pattern or the like corresponding to the person seeking directions. The information carrying member 230 is illustratively a magnetic card, a bar-coded card, a RFID coil, an IR or RF emitting badge, a fingerprint, a retina, or the like. The navigation station 232 in the FIG. 9 embodiment illustratively includes an identification device 234, a processor 236 coupled to a memory 237, and a communication member 238. Illustratively, the identification device 234 corresponds to the particular type of information carrying member 230 used with the navigation system 220. For instance, identification device 234 is a magnetic card reader, a bar code reader, a RF source and receiver, an IR or RF receiver, the fingerprint reader, a retina scanner, or the like.

The identification device 234 detects the identification information from information carrying member 230 and supplies the information to processor 236. Processor 236 is coupled to a database 240 by a wired or wireless communication network 242. Illustratively, database 240 includes destination information corresponding to the identification information detected by identification device 234.

In operation, when a person enters a facility an information carrying member 230 is provided to the person which provides unique identification information for the person as discussed above. Additional information related to the person is obtained and entered into the database by an operator using an input device 244 such as a keyboard, mouse, touch screen display, voice recognition device, or other type of input device. The operator also inputs information in the database 240 related to the selected destination of the person. Database 240 may also include navigation instructions from different navigation stations to selected destinations. The operator may also input the name of the person or certain conditions such as handicaps of the person into the database 240. The identification information on the information carrying member 230 is correlated to the information input in the database 240 related to the particular person.

Once the identification information is detected by identification device 234 at a navigation station 232, processor 236 accesses database 240 to determine the selected destination corresponding to the specific identification information detected from the information carrying member 230 of the particular person. Once the destination information is obtained from database 240, processor 236 can obtain navigation instructions from database 240 or can use navigation instructions stored in memory 237 of navigation station 232. Navigation instructions from the navigation station 232 to the selected destination are then provided to the person using communication member 238. The navigation instructions can be personalized using the person's name identified from database 240 so that the person knows that the instructions provided by the communication member 238 are for him or her. In addition, instructions can be customized based on additional conditions of the person stored in database 240 such as handicaps of the person. For instance, references to color can be omitted if the person is color blind. If the person is mentally or otherwise debilitated and at an unexpected location, the system 220 can alert security to provide assistance.

The communication member 238 may be a speaker, display, or printer as discussed above. In this embodiment, and the other illustrated embodiments of the present invention, the communication member need not be physically "coupled" to the processor. There may be multiple communication members activated by the processor or even subprocessors. For instance, a series of lights may illustratively be installed on every walkway, hallway, step, door of a facility, seat of a sports stadium or the like. When a person enters with the information carrying member, the lights are lit in a way to guide him to the appropriate location, room, seat, or the like. Alternatively, the lights on the correct door or seat may flash to provide an indication to the person. Also, the communication member may be a portable device such as a PalmPilot type device that the navigator carries with him. Therefore, it is understood that the communication member is not be restricted to a display, a speaker, or a printer. The communication member is anything that communicates, whether it is permanently sited or portable, whether it is sight, sound, or feel.

Use of database 240 provides flexibility for the navigation system 220. For example, if a person must go to a second location, the prior location listed in the database 240 is simply replaced with the new location without the requirement for adjusting the information carrying member 230.

Figure 10:
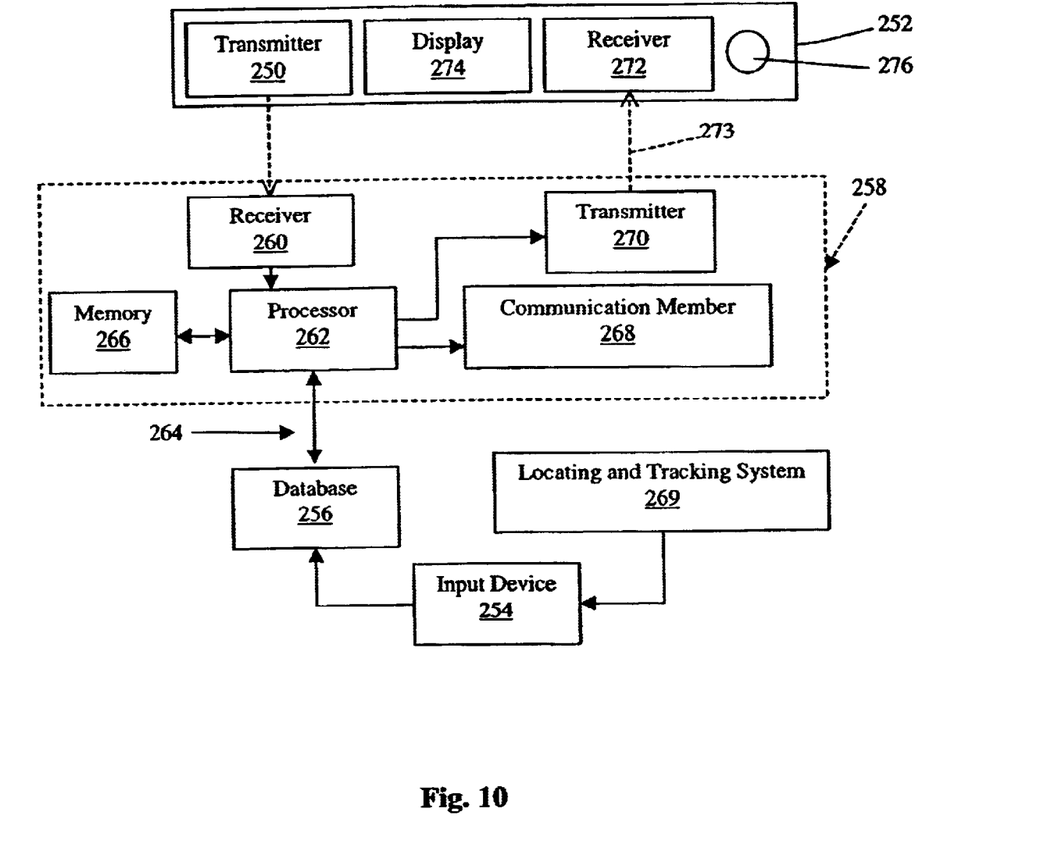
FIG. 10 is a block diagram illustrating yet another embodiment of the present invention which includes a badge which transmits an identification signal to a detector of a navigation station, the navigation station being coupled to a database.

In another embodiment of the present invention illustrated in FIG. 10, the navigation system is integrated with a conventional personnel and asset locating and tracking system such as the COMposer® system or COMLINX™ system available from Hill-Rom NetLinx located in Cary, N.C. See also U.S. Pat. Nos. 5,561,412; 5,699,038; and 5,838,223 which are incorporated herein by reference. In this embodiment, an attendant at a main entrance of a facility or other desired location inputs information related to the person into the locating and tracking system database 256 and then provides the person with a badge 252 which transmits an identification signal including identification information identifying the person and/or a selected destination for the person.

Illustratively, the badge 252 uses an infrared, radio frequency, ultrasonic, or other type of transmitter which periodically transmits signals from the badge. Receivers throughout the facility and on the navigation stations detect the identification information. Therefore, the locating and tracking system tracks movement of the person through the facility and the navigation stations provide directions to the person. An indicator signal may be sent to a receiver on the badge if the patient does not follow directions and is headed in the wrong direction away from the selected destination.

Referring now to FIG. 10, the attendant at the main entrance or other desired location facility provides the person with a transmitter 250 such as an IR, RF, ultrasonic, or other type of transmitter which periodically transmits a unique identification data signal. Illustratively, the transmitter 250 is located on a tag or badge 252 designed to be worn by the person entering the facility. The attendant uses an input device 254 such as a master station of a locating and tracking system to input information related to the person, the selected destination, as well as any other desired information regarding the person such as conditions, handicaps, or the like into a database 256. Information in the database 256 is correlated to the identification information transmitted by transmitter 250.

In operation, when the person approaches a navigation station 258, a receiver 260 of navigation station 258 detects the identification signal from transmitter 250 in a conventional manner. Receiver 260 is coupled to a processor 262 of navigation station 258. Processor 262 accesses the database 256 using a wired or wireless communication network 264. Based on the identification information obtained from the signal, processor 262 obtains corresponding destination information as well as information related to the person such as name, handicaps, or the like from the database 256. Processor 260 then obtains navigation instructions based on the identified destination either from memory 266 of navigation station 258 or from navigation instructions stored in database 256. Processor 260 then communicates the instructions to the person using communication member 268.

Processor 262 also updates the database 256 with the actual location of the person in the facility. Conventional locating and tracking system receivers 269 located throughout the facility also detect the identification signal from transmitter 250. Receivers 269 are coupled to input device 254 to update actual location information related to the person stored in database 256. Therefore, the locating and tracking system tracks the actual location of the person in the facility.

As discussed above with referenced FIG. 9, use of the database 256 provides increased flexibility for the system. If the person desires to go to a second location, the location information can be updated in database 256 without changing the identification signal from transmitter 250. The attendant or operator can also enter a plurality of destinations for the person in database 256. For instance, if a person desires to visit a specific room in a hospital, that room can be entered as the first selected destination. The second selected destination may be, for instance, the cafeteria, the main entrance of the facility or other location. As a patient moves from the main entrance toward the desired room, directions are given at each navigation station 258 toward the room. Once the locating and tracking system detects that a person has reached the first selected destination, subsequent movement of the patient will cause directions to be given to the second selected destination. In another embodiment, as discussed above, the attendant may program the transmitter with a unique identification signal corresponding to the selected destination.

In yet another embodiment of the present invention, the navigation station 258 includes a transmitter 270 and the badge 252 includes a receiver 272. Processor 262 provides a wireless signal 273 from transmitter 270 to receiver 272. Receiver 272 is coupled to display 274 on badge 252. Display 274 may be a indicator light, LCD display, or other type of display screen. In addition, a speaker 276 may be provided on badge 252. Therefore, the navigation instructions or other information may be transmitted directly to the display 274 or speaker 276 of badge 252.

The locating and tracking system tracks movement of the patient through the facility and the navigation stations 258 provide directions to the person. The indicator signal 273 can be provided from transmitter 270 to badge 252 if the locating and tracking system determines that a person has not followed the directions given to the person and is located at an unexpected location. A signal or instructions can also be provided to the person using a transmitter located at the master station or using conventional paging or messaging techniques.

Although the invention has been described in detail with reference to certain illustrated embodiments, variations and modifications exist within the scope and spirit of the present invention as defined in the following claims.

What is claimed is:

1. A navigation system configured to direct a person to a selected destination, the system comprising:

a first station having a first input device to select a destination, a first processor coupled to the first input device, and an output device coupled to the first processor, the output device being configured to provide an information carrying member for the person; and a second station located at a fixed location along a route to the selected destination including a second input device configured to receive information indicating the selected destination from the information carrying member, a second processor coupled to the second input device, and a communication member coupled to the second processor, the second processor being configured to determine instructions to direct the person from the fixed location toward the selected destination based at least on the information indicating the selected destination received from the information carrying member and the communication member being configured to communicate the instructions by at least one of visual instructions and audio instructions directly to the person.

2. The navigation system of claim 1, wherein the second input device is an information detector configured to identify the selected destination automatically from the information carrying member.

3. The navigation system of claim 1, wherein the information carrying member is a magnetic stripe on a card and the output device is an encoder which encodes information on the magnetic stripe on the card.

4. The navigation system of claim 3, wherein the second input device is a magnetic stripe decoder configured to read the information from the magnetic stripe on the card.

5. The navigation system of claim 1, wherein the information carrying member is a bar code on a card, output device includes an encoder which encodes the bar code on the card to provide information, and the second input device is a bar code reader configured to read the bar code to obtain the information.

6. The navigation system of claim 1, wherein the information carrying member is a smart card, the output device being configured to store information in the smart card, and the second input device being configured to read the information from the smart card.

7. The navigation system of claim 1, wherein the information carrying member is a badge configured to transmit a signal including information corresponding to the selected destination and the second input device is a receiver on the second station configured to receive the signal from the badge and identify the selected destination from the signal.

8. The navigation system of claim 7, wherein the badge signal also includes a unique identification portion identifying the person.

9. The navigation system of claim 8, further comprising a locating and tracking system configured to receive the signal from the badge to monitor a location of the person within a facility.

10. The navigation system of claim 9, further comprising means for transmitting an indicator signal to the badge if the locating and tracking system determines that the person is not following the instructions to the selected destination.

11. The navigation system of claim 7, wherein the badge signal is one of an infrared signal, a radio frequency signal, and an ultrasonic signal.

12. The navigation system of claim 1, wherein the first station includes a display, the processor being configured to display a menu of possible selected destinations on the display for selection by the first input device.

13. The navigation system of claim 1, wherein the second processor is coupled to a communication network, the second processor being configured to access a database to determine the instructions to direct the person from the fixed location toward the selected destination.

14. The navigation system of claim 1, wherein the first station is coupled to a communication network, the first processor being configured to receive data related to a plurality of selected destinations over the communication network.

15. The navigation system of claim 1, wherein the second input device is a manual input device.

16. The navigation system of claim 1, wherein the instructions communicated by the second station direct the person to a third station identical to the second station but located at a second location closer to the selected destination.

17. The navigation system of claim 1, wherein the information carrying member includes printed information thereon.

18. The navigation system of claim 17, wherein the printed information is advertising material.

19. The navigation system of claim 1, wherein the second station further includes an input to permit the person to request directions back to the first station.

20. The navigation system of claim 1, wherein the communication member includes at least one of a display, a speaker, and a printer.

21. The navigation system of claim 1, wherein the information carrying member also includes a language indicator to indicate a desired language for the instructions from the communication member.

22. The navigation system of claim 21, wherein the second input device is configured to receive the language indicator from the information carrying member, and the instructions are then communicated to the person by the communication member in the language specified by the language indicator.

23. The navigation system of claim 1, wherein the information carrying member further includes information corresponding to a first selected destination and information corresponding to a second selected destination.

24. The navigation system of claim 23, wherein the second selected destination is a main entrance of a facility.

25. The navigation system of claim 23, wherein the second selected destination is the location of the first station so that the person can obtain directions back to the location of the first station from the second station.

26. The navigation system of claim 1, wherein a plurality of second stations are located at spaced apart locations, each second station being configured to identify the selected designation using information from the information carrying member and to provide instructions on the communication member to direct the person to one of another second station and the selected destination.

27. The navigation system of claim 26, wherein the instructions increase in detail the closer that the person is to the selected destination.

28. The navigation system of claim 1, wherein the information carrying member is a badge configured to transmit a signal including identification information related to the person, and the second input device is a receiver on the second station configured to receive the signal from the badge and to detect the identification information from the signal.

29. The navigation system of claim 28, further comprising a locating and tracking system configured to receive the signal from the badge to monitor a location of the person within a facility.

30. The navigation system of claim 29, further comprising means for transmitting an indicator signal to the badge if the locating and tracking system determines that the person is not following the instructions to the selected destination.

31. The navigation system of claim 28, wherein the badge signal is one of an infrared signal, a radio frequency signal, and an ultrasonic signal.

32. The navigation system of claim 28, wherein the second processor is configured to access a database to determine the selected destination based on the identification information.

33. The navigation system of claim 1, wherein the information carrying member includes identification information related to the person, and further comprising a database configured to store a selected destination corresponding to the identification information, the input device being configured to detect the identification information from the information carrying member, and the processor being configured to determine the selected destination from the database based on the identification information.

34. A method to navigate a person to a selected destination, the method comprising the steps of:

providing a person with an information carrying member corresponding to the selected destination;

providing a plurality of navigation stations at spaced apart fixed locations;

identifying the selected destination at a selected one of the plurality of navigation stations based on information indicating the selected destination received from the information carrying member;

determining instructions to direct the person from the fixed location of the selected one of the plurality of navigation stations toward the selected destination based at least on the information indicating the selected destination received from the information carrying member; and communicating instructions directly to the person to direct the person to one of another of the plurality navigation stations and the selected destination, the communicated instructions including at least one of visual instructions and audio instructions.

35. The method of claim 34, wherein the identifying step occurs automatically at the selected navigation station.

36. The method of claim 34, further comprising the step of providing a core station configured to generate the information carrying member based on a selection of the selected destination at the core station.

37. The method of claim 34, wherein the identifying step includes one of reading a magnetic stripe on the information carrying member, reading a bar code on the information carrying member, receiving a signal from the information carrying member, and receiving a manual input from the person using the information carrying member.

38. The method of claim 34, wherein the communicating step includes at least one of printing the instructions, displaying the instructions, and announcing the instructions.

39. The method of claim 34, further comprising the step of monitoring a location of the person.

40. A navigation system configured to direct a person to a selected destination using an information carrying member, the system comprising:

a plurality of navigation stations located at a plurality of fixed locations, each navigation station comprising:

an input device configured to receive information indicating the selected destination from the information carrying member;

a processor coupled to the input device; and a communication member coupled to the processor, the processor being configured to determine instructions to direct the person from the fixed location of the navigation station toward the selected destination based at least on the information indicating the selected destination received from the information carrying member and to communicate the instructions directly to the person using the communication member, the communicated instructions including at least one of visual instructions and audio instructions.

41. The navigation system of claim 40, wherein the input device is an information detector configured to identify the selected destination automatically from the information carrying member.

42. The navigation system of claim 40, wherein the information carrying member is a magnetic stripe on a card and the input device is a magnetic stripe decoder configured to read the information from the magnetic stripe on the card.

43. The navigation system of claim 40, wherein the information carrying member is a bar code on a card and the input device is a bar code reader configured to read the bar code to obtain the information.

44. The navigation system of claim 40, wherein the information carrying member is a smart card and the input device is configured to read the information from the smart card.

45. The navigation system of claim 40, wherein the information carrying member is a badge configured to transmit a signal including information corresponding to the selected destination and the input device is a receiver configured to receive the signal from the badge and identify the selected destination from the signal.

46. The navigation system of claim 45, wherein the badge signal also includes a unique identification portion identifying the person.

47. The navigation system of claim 46, further comprising a locating and tracking system configured to receive the signal from the badge to monitor a location of the person within a facility.

48. The navigation system of claim 47, further comprising means for transmitting an indicator signal to the badge if the locating and tracking system determines that the person is not following the instructions to the selected destination.

49. The navigation system of claim 45, wherein the badge signal is one of an infrared signal, a radio frequency signal, and an ultrasonic signal.

50. The navigation system of claim 40, wherein the processor is coupled to a communication network, the processor being configured to access a database to determine the instructions to direct the person toward the selected destination.

51. The navigation system of claim 40, wherein the input device is a manual input device.

52. The navigation system of claim 40, wherein the communication member includes at least one of a display, a speaker, and a printer.

53. The navigation system of claim 40, wherein the information carrying member also includes a language indicator to indicate a desired language for the instructions from the communication member.

54. The navigation system of claim 53, wherein the input device is configured to receive the language indicator from the information carrying member, and the instructions are then communicated to the person by the communication member in the language specified by the language indicator.

55. The navigation system of claim 40, wherein the information carrying member includes identification information related to the person, and further comprising a database configured to store a selected destination corresponding to the identification information, the input device being configured to detect the identification information from the information carrying member, and the processor being configured to determine the selected destination from the database based on the identification information.

56. The navigation system of claim 40, wherein the processor is configured to determine the instructions to direct the person toward the selected destination from the database.

57. A navigation system configured to direct a person to a selected destination within a facility, the system comprising:

an information carrying member configured to contain at least information related to the selected destination;

a programming unit, the programming unit being configured to program the information carrying member with the information related to the selected destination; and at least one navigation station located at a first fixed location within the facility; the at least one navigation station including an identification device being configured to acquire the information related to the selected destination from the information carrying member; a processor being configured to determine instructions to direct the person from the first location toward the selected destination based at least on the information related to the selected destination received from the information carrying member and a communication member being configured to communication the instructions to the person, the instructions including at least one of visual instructions and audio instructions.

58. The navigation system of claim 57, wherein the instructions are visually communicated to the person by the communication member.

59. The navigation system of claim 58, wherein the instructions are further audibly communicated to the person by the communication member.

60. The navigation system of claim 57, wherein the instructions are visually communicated by displaying text related to the instructions on a display.

61. The navigation system of claim 57, wherein the instructions are audibly communicated to the person by the communication member.

62. The navigation system of claim 57, wherein the information carrying member is further configured to contain information related to the person.

63. The navigation system of claim 62, wherein the information related to the person includes a language indicator and the at least one navigation station provides instructions to the person in a first language based on the language indicator.

64. The navigation system of claim 62, wherein the information related to the person includes a name of the person and the at least one navigation station provides instructions to the person including the name of the person.

65. The navigation system of claim 62, wherein the information related to the person includes a first condition of the person and the at least one navigation station provides customized instructions to the person based upon the first condition.

66. The navigation system of claim 65, wherein the first condition is related to a handicap associated with the person.

67. A navigation system for use within a facility having a desired point of entrance, the navigation system configured to direct a person to a selected destination based at least on information indicating the selected destination received from an information carrying member associated with the person and to direct the person to the desired point of entrance from a first location within the facility, the system comprising:

a plurality of navigation stations located at a plurality of fixed locations within the facility; each navigation station comprising:
 a processor;
 a communication member coupled to the processor;
 a first input device configured to be activated directly by the person and coupled to the processor, the processor being configured to provide a first set of instructions including at least one of visual instructions and audio instructions directly to the person using the communication member directing the person towards the desired point of entrance in response to activation of the first input device; and
 a second input device coupled to the processor and configured to receive information indicating the selected destination from the information carrying member, wherein the processor is further configured to determine a second set of instructions to direct the person toward the selected destination and to communicate the second set of instructions including at least one of visual instructions and audio instructions to the person using the communication member in response to the second input device receiving information indicating the selected destination from the information carrying member.

68. The navigation system of claim 67, wherein the navigation system further comprises an information carrying member configured to contain unique identification information and wherein the second input device is configured to acquire the unique identification information from the information carrying member.

69. The navigation system of claim 68, wherein the information carrying member further includes a transmitter configured to transmit a signal including the unique identification information and the second input device includes a receiver configured to receive the signal from the information carrying member.

70. The navigation system of claim 69, further comprising a locating and tracking system configured to receive a signal including at least the unique identification information from at least one of the information carrying member and the plurality of navigation stations to monitor a location of the person within a facility.

71. The navigation system of claim 68, wherein each of the plurality of navigation stations are coupled to a communication network and are configured to have access to a database, the database including at least information related to a selected destination, the information related to the selected destination being correlated to the unique identification information contained by the information carrying member.

* * * * *